(12) United States Patent
Vasquez

(10) Patent No.: US 7,862,946 B1
(45) Date of Patent: Jan. 4, 2011

(54) SELF-REGULATING CONTROL OF PARASITIC LOADS IN A FUEL CELL POWER SYSTEM

(75) Inventor: Arturo Vasquez, Pasadena, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1004 days.

(21) Appl. No.: 11/671,210

(22) Filed: Feb. 5, 2007

(51) Int. Cl.
*H01M 8/04* (2006.01)

(52) U.S. Cl. .................. 429/430; 429/428; 429/431; 429/432; 429/452

(58) Field of Classification Search .................. None
See application file for complete search history.

(56) References Cited

U.S. PATENT DOCUMENTS

| | | | |
|---|---|---|---|
| 4,000,003 A | 12/1976 | Baker et al. | |
| 5,082,505 A | 1/1992 | Cota et al. | |
| 5,366,821 A | 11/1994 | Merritt et al. | |
| 6,083,636 A | 7/2000 | Hsu | |
| 6,158,537 A | 12/2000 | Nonobe | |
| 6,294,278 B1 | 9/2001 | Wohr et al. | |
| 6,835,481 B2 | 12/2004 | Dickman et al. | |
| 2002/0072834 A1 | 6/2002 | Scheffler et al. | |
| 2004/0202900 A1 | 10/2004 | Pavio et al. | |
| 2005/0112428 A1 | 5/2005 | Freeman et al. | |
| 2005/0164048 A1 | 7/2005 | Wheat et al. | |

*Primary Examiner*—Ula C Ruddock
*Assistant Examiner*—Tony Chuo
(74) *Attorney, Agent, or Firm*—Kurt G. Hammerle

(57) ABSTRACT

A fuel cell power system comprises an internal or self-regulating control of a system or device requiring a parasitic load. The internal or self-regulating control utilizes certain components and an interconnection scheme to produce a desirable, variable voltage potential (i.e., power) to a system or device requiring parasitic load in response to varying operating conditions or requirements of an external load that is connected to a primary fuel cell stack of the system. Other embodiments comprise a method of designing such a self-regulated control scheme and a method of operating such a fuel cell power system.

12 Claims, 2 Drawing Sheets

SELF-REGULATING CONTROL OF PARASITIC LOADS IN A FUEL CELL POWER SYSTEM

ORIGIN OF THE INVENTION

The invention described herein was made by employee(s) of the United States Government and may be manufactured and used by or for the Government of the United States of America for governmental purposes without the payment of any royalties thereon or therefore.

BACKGROUND OF THE INVENTION

1. Field of the Invention

The present invention relates generally to an electric power generation system comprising a fuel cell, and to a method of designing and operating such a fuel cell power system. More specifically, the embodiments described herein include an internal or self-regulating control of a system or device requiring a parasitic load in a fuel cell power system.

2. Description of Related Art

Electric power generation systems comprising at least one fuel cell, also know as fuel cell power systems, typically have need for control of at least one system or device that requires parasitic electric load or power. Examples of such systems or devices requiring parasitic power include, but are not limited to, coolant flow systems, a motor-driven coolant pump, circulation systems that control reactant gas circulation rates for water removal, systems for stack reactant inlet pre-humidification, centrifugal water separators, and heaters needed for maintenance of stack operating temperature when the waste heat production from the fuel cell stack cannot maintain the appropriate temperature.

The related art teaches the use of various externally added active controllers, such as electronic power control units for coolant pump motor speed control, for the control and operation of such parasitic load-demanding systems or devices. For example, electrical or mechanical thermostatic control and/or current sensors provide feedback to controllers of the motor speed of a coolant pump. Such externally-added active controllers may require on-board or external power conditioning, feedback design and control, DC-to-AC converters, variable frequency inverters, and the like.

The following patents and published patent applications disclose art related to the embodiments described in the Detailed Description of this patent application:

U.S. Pat. No. 6,835,481, issued Dec. 28, 2004, to Dickman et al, discloses a fuel cell system having partial and/or total redundancy of at least one operational component, such as a redundancy of fuel cell stacks and/or fuel processors. In some embodiments, the fuel cell system includes a plurality of fuel cell stacks adapted to deliver the same maximum rated power output as a comparative fuel cell system having only a single fuel cell stack. In some embodiments, the fuel cell system includes a plurality of fuel cell stacks adapted to deliver more than the maximum rated power output of the comparative fuel cell system. In some embodiments, the fuel cell system includes a plurality of fuel cell stacks having at least n+1 (or total) redundancy compared to a fuel cell system having only a single fuel cell stack. In some embodiments, the fuel cell system includes a control system and/or structure adapted to limit the applied load to the system.

U.S. Pat. No. 6,294,278, issued Sep. 25, 2001, to Wohr et al, discloses a fuel cell system having two fuel cell stacks with different operating temperatures, i.e. a low temperature stack (LT stack) and a high temperature stack (HT stack). The high temperature stack is connected in front of the low temperature stack with respect to the process flow of fuel through the fuel cell system.

U.S. Pat. No. 6,158,537, issued Dec. 12, 2000, to Nonobe, discloses a power supply system with a stack of fuel cells and a storage battery that includes a remaining charge monitor for measuring the remaining charge of the storage battery. The remaining charge monitor detects the remaining charge of the storage battery at the time of stopping operation of the power supply system. In case the remaining charge of the storage battery is not greater than a predetermined level, the fuel cells continuously charge the storage battery until the remaining charge reaches the predetermined level. The power supply system is stopped after the charging operation of the storage battery has been accomplished. At a next start of the power supply system, the storage battery functions as a primary power source to supply electric power to a loading until the warm-up of the fuel cells is completed.

U.S. Pat. No. 6,083,636, issued Jul. 4, 2000, to Hsu, discloses a system and method for producing electricity with a fuel cell power system. The power system includes an assembly of fuel cell stacks that operate at different temperatures, which vary between two or more of the fuel cell stacks. The fuel cell stack can have multiple temperature regions formed axially along the stack, or a plurality of spatially separated fuel cell stacks can be employed to heat a reactant from an input temperature to a desired temperature. The fuel cell stacks have operating temperatures in the range between about 20 degrees Centigrade and about 2000 degrees Centigrade.

U.S. Pat. No. 4,000,003, issued Dec. 28, 1976, to Baker et al, discloses a hybrid fuel cell secondary battery system suitable for low power sensor applications. The system comprises in combination, a fuel cell, a fully contained fuel and oxidant source for the fuel cell, a DC to DC power processor for boosting the voltage output from the fuel cell, and a nickel-cadmium battery in parallel with the output from the DC to DC processor to sustain peak power drains.

U.S. Patent Application Publication No. 2002/0072834, published Jun. 13, 2002, to Scheffler et al, discloses a method and system for controlling a fuel cell power plant in a predictive manner providing a rapid response of the fuel cell stack assembly (CSA) without creating an unacceptable condition of reactant/coolant starvation caused by instantaneous electrical load transients of the load(s) controllably connected to the CSA. A demand signal representing the anticipated current/power required by the electrical load(s) is provided. A current signal representative of the actual current drawn by the load(s) is provided. The greater of the demand signal and the current signal is selected and utilized to provide a control signal for regulating one or more of the reactants and coolant to effect the operating process of the CSA. One or more status signals indicative of the status of a regulated one or more of the reactants/coolant and/or a respective operating process effected, is provided. Each status signal is transformed to a respective load capability signal which is used to regulate load current based on fuel cell reactant status and/or CSA predicted performance during transients. The lesser of the demand signal and each of the load capability signals is selected to provide an output signal for commensurately controlling a system load.

U.S. Patent Application Publication No. 2004/0202900, published Oct. 14, 2004, to Pavio et al, discloses a system and method for controlling or otherwise effectively managing cell voltage degradation in the operation of a fuel cell device. The system comprises inter alia a fuel cell in parallel electrical connection with a secondary power source and an automated controller for switching between power supplied from the fuel cell and the secondary power source.

U.S. Patent Application Publication No. 2005/0164048, published Jul. 28, 2005, to Wheat et al., discloses a fuel cell system that includes fuel cell stacks electrically connected in parallel and supplying a gross current to a load. A controller determines the gross load current and produces a desired current through the load by adjusting, based on the gross load current, at least one parameter affecting at least one of the inputs to and outputs from the system. This system allows a stack design and its voltage output to be kept constant while stacks are added for increased power.

SUMMARY OF THE INVENTION

The present invention comprises various embodiments, including an internal or self-regulating control of a system or device requiring a parasitic load in a fuel cell power system and a fuel cell power system comprising an internal or self-regulating control, as well as a method of designing such a self-regulated control scheme and a method of operating such a fuel cell power system.

Accordingly, one embodiment of the present invention comprises a method for designing an internal or self-regulated control to produce variable voltage potential (i.e., power) to a system or device requiring a parasitic load in response to varying operating conditions or requirements of an external load connected to a primary fuel cell stack. The method may comprise one or more steps such as, for example, providing a parasitic fuel cell stack that is operatively connected to supply electricity to the system or device requiring a parasitic load. Other steps might comprise selecting variable characteristics of the parasitic or primary fuel cell stack such that when operating characteristics of the primary fuel cell stack change in response to load variations of the external load, the self-regulated control correspondingly results in a variable voltage difference between the parasitic fuel cell stack and the primary fuel cell stack.

The step of selecting characteristics of the parasitic or primary fuel cell stack may further comprise selecting a fuel cell stack area for each of a plurality of fuel cells for the parasitic fuel cell stack, arranging the parasitic fuel cell stack not to be connected to supply electricity to the external load, and/or selecting the number of fuel cells in the parasitic fuel cell stack. The method may further comprise modeling a resistance of the parasitic load and/or utilizing a projected resistance of the external load for calculation of a voltage or a current across each of a second plurality of fuel cells that form the primary fuel cell stack.

Another embodiment of the present invention is a fuel cell power system that comprises an internal or self-regulated control for adjusting an amount of power supplied to the parasitic load that may comprise a first electrical terminal and a second electrical terminal for receiving power. In another embodiment of the invention, the internal or self-regulated control may comprise one or more elements such as, for example, a parasitic fuel cell stack that may comprise a first plurality of fuel cells. A primary fuel cell stack may comprise a second plurality of fuel cells. The primary fuel cell stack is operatively connected to an external load. A common electrical connection is provided between a first side of the parasitic fuel cell stack and a first side of the primary fuel cell stack. An electrical connection from a second side of the parasitic fuel cell stack to the first electrical terminal of the parasitic load is provided whereby operating characteristics of the primary fuel cell stack produce a correspondingly desirable variation in power supplied to the parasitic load. The control may further comprise an electrical connection from a second side of the primary fuel cell stack to the second electrical terminal of the parasitic load. The operating characteristics of either fuel cell stack correspondingly change with the changing requirements of the external load in a manner whereby the control of the parasitic load is inherently load-following. In one additional embodiment, the parasitic fuel cell stack and the primary fuel cell stack may or may not comprise two or more separate fuel cell stacks.

In another interconnection scheme, the first side of the parasitic fuel cell stack and the first side of the primary fuel cell stack comprise a more positive voltage than the second side of the parasitic fuel cell stack and the second side of the primary fuel cell stack, respectively. The second electrical terminal of the parasitic load is more positive in voltage during operation than the first electrical terminal of the parasitic load.

In another embodiment, a fuel cell area for each of the first plurality of fuel cells and for each of the second plurality of fuel cells may be selected to produce a projected desirable amount of the power supplied to the parasitic load. Similarly, a first number of the first plurality of fuel cells and a second number of the second plurality of fuel cells may be selected to produce a projected amount of the power supplied to the parasitic load.

The invention may comprise other methods such as methods for operation of a fuel cell power system comprising a self-regulated control of parasitic load by adjusting an amount of power supplied to the parasitic load comprising one or more systems or devices. Such step of adjusting may comprise one or more acts such as, for instance, powering an external variable load with a primary fuel cell stack, establishing a common electrical connection between a first side of a parasitic fuel cell stack and a first side of the primary fuel cell stack, and establishing an electrical connection from a second side of the parasitic fuel cell stack to the first electrical terminal of the parasitic load, whereby operating characteristics of the primary fuel cell stack change with correspondingly changing requirements of the external load to produce an internally-controlled yet also desirable variation in power supplied to the parasitic load. In this embodiment, when the variable voltage difference is applied to the system or device requiring a parasitic load, then the system or device requiring a parasitic load is powered in a manner that is responsive (i.e., load-following) to the varying load conditions of the external load.

DETAILED DESCRIPTION OF PREFERRED EMBODIMENTS

Figure 1:
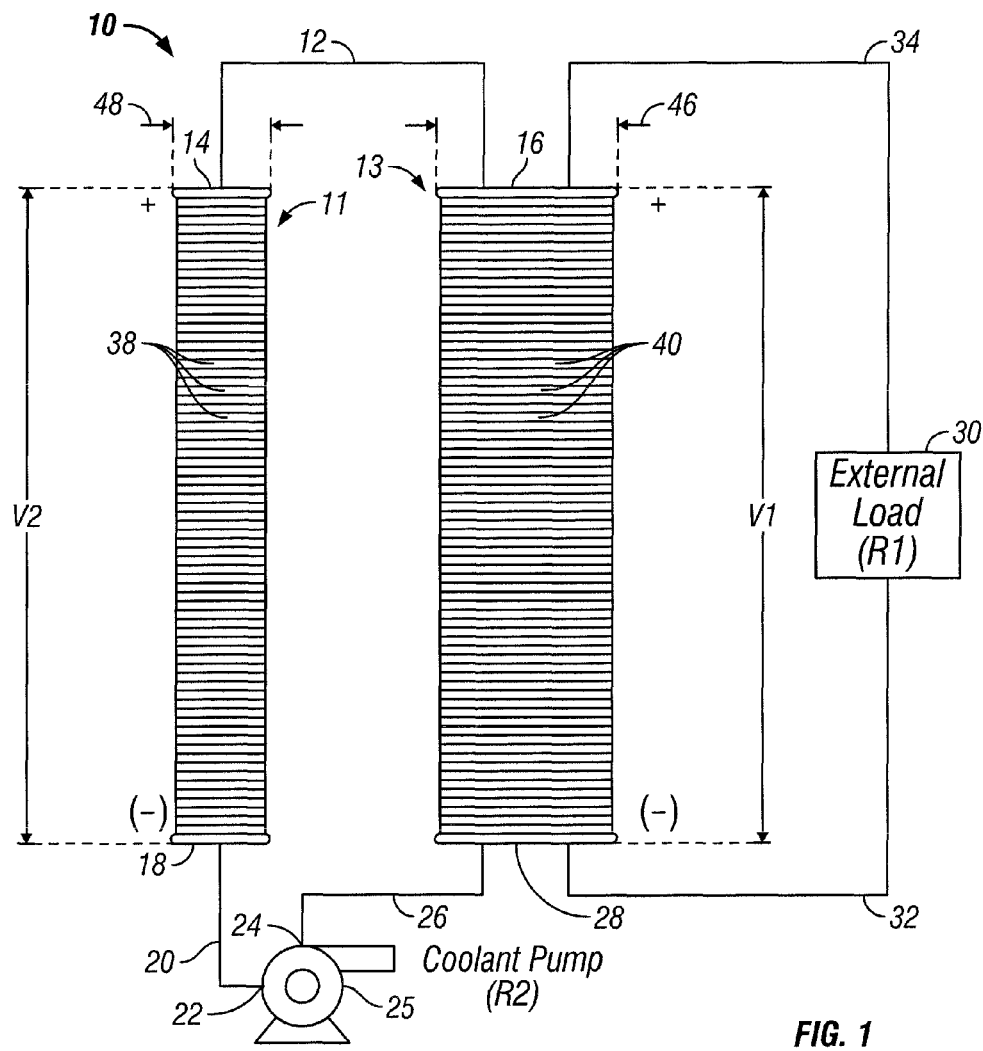
FIG. 1 is a schematic diagram of a fuel cell power system comprising an internal or self-regulating control for a parasitic load in accordance with one embodiment of the invention.

Referring now to the drawings and, more particularly to FIG. 1, an internal or self-regulated control 10 for a fuel cell power system is shown in accordance with one embodiment of the present invention. Internal or self-regulated control 10 provides a load-following parasitic power control scheme that may be built into a typical fuel cell power system in different ways, examples of which are illustrated and discussed below. The control scheme takes advantage of the operating characteristics of fuel cell stacks when the power supply is essentially unregulated. Such operating characteristics are represented generally in the plot of FIG. 2, which shows that fuel cell voltage decreases with increasing current density in greater extremes than what typically occurs with battery-based power systems.

The embodiment illustrated in FIG. 1 comprises two separated fuel cell stacks, namely a parasitic load fuel cell stack 11 and a primary fuel cell stack 13. For ease of viewing, the fuel cell stacks 11 and 13 are represented without their correspondingly integrated subsystems, such as, for example fuel circuits, reactant supply flow paths, or coolant circuits. Examples of such integrated subsystems are given in U.S. Pat. No. 5,366,821, which is hereby incorporated in its entirety by reference. The fuel cells stacks, while represented in FIG. 1 as separate and apparently independent stacks, could in an alternate embodiment be constructed as a single fuel cell stack system integrated with a common subsystem for the management or supply of such necessary fluids as fuel, reactant, or coolant.

The two fuel cell stacks 11 and 13 may be operatively connected together (such as, for example, electrically) at its respective positive ends or terminals 14 and 16 or its respective negative ends or terminals 18 and 28. In this case, parasitic load fuel cell stack 11 and primary fuel cell stack 13 are operatively connected at its respective positive ends 14 and 16 by cable 12, which may comprise a shorting cable or other form of electrical lead. In this embodiment, the system or device requiring a parasitic load, referred to hereinafter simply as a "parasitic load", is represented in FIG. 1 as a coolant pump. Parasitic load 25 is operatively connected between the negative ends 18 and 28 by cables 20 and 26. Parasitic load 25 may be electrically connected, in one example, with its positive electrical power terminal 24 fed from the negative end 28 of primary fuel cell stack 13. The negative power terminal 22 of the parasitic powered device 25 may then be attached to the negative end 18 of parasitic load fuel cell stack 11.

Continuing with the embodiment of FIG. 1, an external load 30 is operatively connected on one end to positive end 16 of primary fuel cell stack 13 by cable 34 and on its second end to the negative end 28 by cable 32. The voltage across primary fuel cell stack 13 is represented by the variable V1 and the voltage across parasitic load fuel cell stack 11 is represented by variable V2. External load 30 may typically vary in its power consumption requirements or needs due to varying operating circumstances or conditions.

Figure 2:
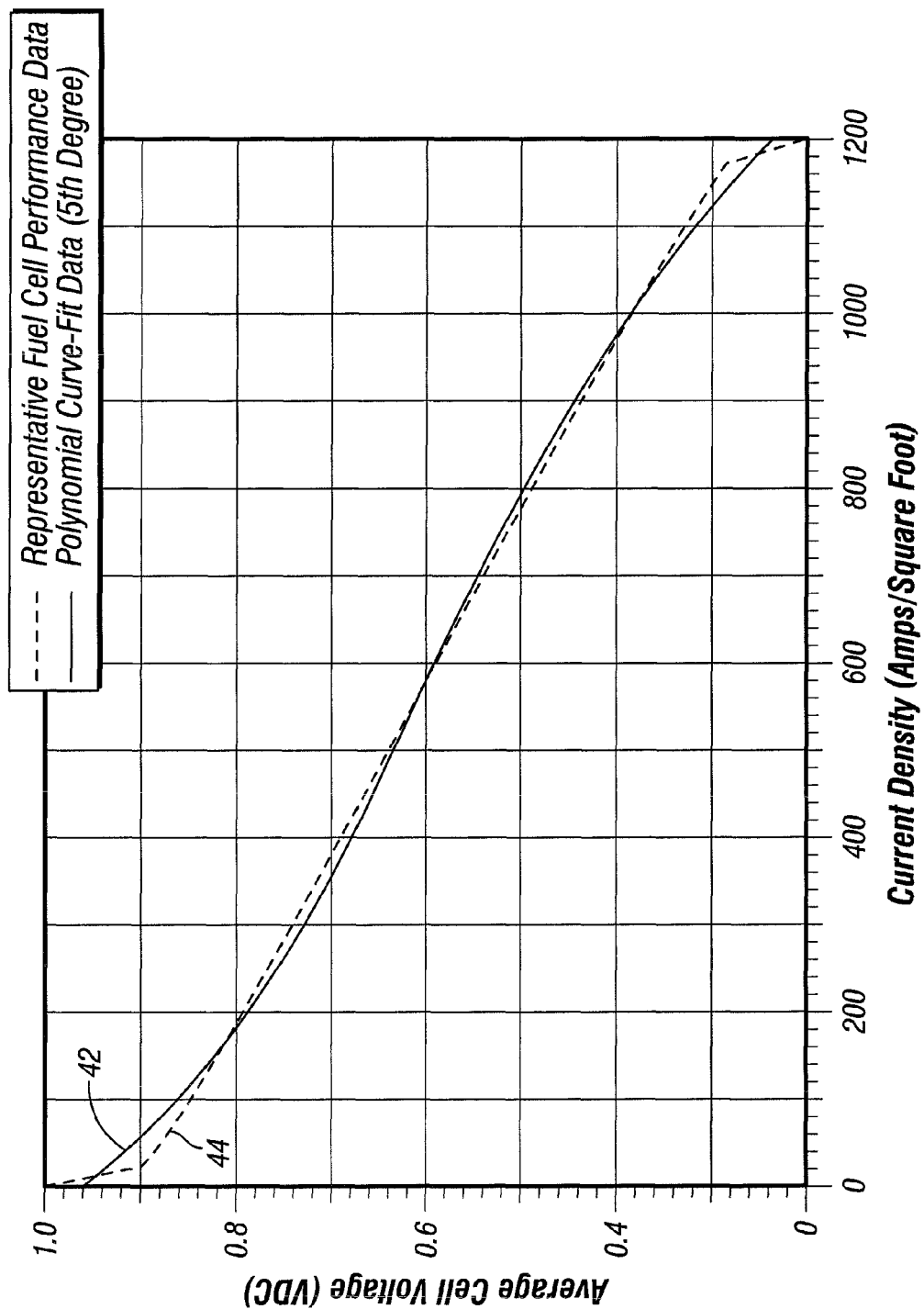
FIG. 2 is a plot of fuel cell voltage as a function of current density representative of fuel cell operating (i.e., performance) characteristics for a selected fuel cell stack that provides an analytical model for predicting operation of such fuel cell stack in accordance with another embodiment of the invention.

FIG. 2 shows a plot of fuel cell voltage as a function of current density for a selected fuel cell stack that identifies the operating characteristics (i.e., performance) of the selected fuel cell stack. In particular, curve 44 is a plot of data representative of fuel cell performance for a particular primary fuel cell stack. As illustrated by curve 44, the decrease in voltage V1 may be represented as a function of the current density of the particular primary fuel cell stack 13 that is chosen. As will be discussed in further detail below, the plot of FIG. 2 enables the development of an analytical model for predicting electrical performance of a selected primary fuel cell stack during various operating circumstances. In similar fashion, the performance data for other fuel cell stacks, including the parasitic fuel cell stack, could be plotted.

Given the operative connections of the embodiment of FIG. 1 among the two fuel cell stacks 11 and 13, the external load 30, and the parasitic load 25, and the performance characteristics recognized in FIG. 2, as the electrical power output of the primary fuel cell stack 13 (measured by its current density) increases, the voltage V1 across primary fuel cell stack 13 will decrease as compared to voltage V2 across parasitic load fuel cell stack 11. As the voltage of the primary fuel cell stack 13 decreases with increasing load, the voltage difference between the negative end 28 of primary fuel cell stack 13 and the negative end 18 of parasitic fuel cell stack 11 will correspondingly increase. This external load-following increase in the voltage-difference between V1 and V2 correspondingly increases current flow through the parasitic load 25.

The amount of increase of current flow (and, thereby, power) supplied to parasitic load 25 as compared to the variation in load from external load 30 may be modeled and adjusted to a predetermined level by calculated selection of certain fuel cell stack design variables, such as, for example, the fuel cell stack areas 46 and 48, the numbers of cells 38 and 40 in each stack, and the resistance R2 of parasitic load 25. With use of the operative connections of FIG. 1 and selective design, a customized, internal or self-regulated control 10 for a fuel cell system can be built to perform in a desirable manner that internally adjusts as required by the varying operating conditions or requirements of the external load.

As mentioned previously, an alternate embodiment of the present invention comprises two fuel cell stacks integrated together such that they share a common fluids management subsystem. In this alternate embodiment, if power to external load 30 is supplied from only a portion of the primary fuel cell stack but not from the parasitic fuel cell stack, then a variable difference in voltage potential develops between the parasitic fuel cell stack and the primary fuel cell stack for the same reasons as discussed before, enabling a similar selective design for the building of a customized, internal or self-regulated control 10.

The internal or self-regulated control 10 of FIG. 1 indicates the system or device requiring a parasitic load as a coolant pump. Similarly, the system or device requiring a parasitic load may comprise a reactant circulation pump. Both the coolant pump and the reactant circulation pump share a common requirement during the development of a customized design: they require increased power when the power output for the fuel cell power system is also increasing. However, the present invention may embrace alternate embodiments in which the parasitic load 25 is a system or device desirably operating during conditions when the fuel cell power system is at a low power level. During low-power (i.e., low current density) operation, voltage across the parasitic fuel cell stack increases and may be applied to those parasitic loads that require additional power input during the time of such low-power operation, such as auxiliary centrifugal water separators or heaters needed for maintenance of stack temperature when the waste heat production from the fuel cell stack cannot maintain the appropriate temperature.

Another embodiment of the present invention comprises a method of designing a fuel cell power system incorporating an internal or self-regulated control of the parasitic load. The internal or self-regulated control produces a desirable variable voltage potential (i.e., power) to a system or device requiring a parasitic load in response to the varying operating conditions or requirements of an external load connected to a primary fuel cell stack. The method may comprise one or more steps such as, for example, providing a parasitic fuel cell stack that is operatively connected to supply electricity to the system or device requiring a parasitic load. Another step might comprise selecting certain design variables or performance characteristics of the parasitic fuel cell stack such that when operating conditions of the primary fuel cell stack change in response to varying operating conditions or requirements of the external load, the self-regulated control correspondingly results in a predetermined variable voltage difference between the parasitic fuel cell stack and the primary fuel cell stack. Yet another step might comprise selecting certain design variables or performance characteristics of the primary fuel cell stack such that when operating conditions of the primary fuel cell stack change in response to varying operating conditions or requirements of the external load, the self-regulated control correspondingly results in a predetermined variable voltage difference between the parasitic fuel cell stack and the primary fuel cell stack. In this embodiment, when the variable voltage difference is applied to the system or device requiring a parasitic load, then the system or device requiring a parasitic load is powered in a desirable manner that is responsive (i.e., load-following) to the varying load conditions of the external load.

The step of selecting certain design variables or performance characteristics of the parasitic fuel cell stack may further comprise selecting a fuel cell stack area for each of a plurality of fuel cells for the parasitic fuel cell stack, arranging the parasitic fuel cell stack to not be operatively connected to supply electricity to the external load, and/or selecting the number of fuel cells in the parasitic fuel cell stack. The step of selecting certain design variables or performance characteristics of the primary fuel cell stack may further comprise selecting a fuel cell stack area for each of a plurality of fuel cells for the primary fuel cell stack and/or selecting the number of fuel cells in the primary fuel cell stack. The method for designing may further comprise the step of modeling the electrical circuit for determining a resistance R2 of a selected parasitic load and/or utilizing a projected resistance R1 of the external load for calculation of a voltage or a current across each of a second plurality of fuel cells that form the primary fuel cell stack.

Figure 3:
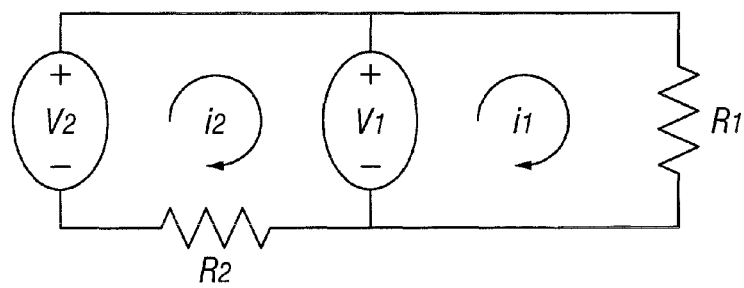
FIG. 3 is a representative model of the circuit of FIG. 1 utilizing Ohm's Law to provide two mesh analysis equations used for the method of designing a fuel cell power system comprising an internal or self-regulated control in accordance with another embodiment of the present invention.

As shown by FIG. 3, the step of modeling the electrical circuit representative of the fuel cell system of FIG. 1 may comprise the act of performing mesh analysis, also known as loop analysis, to produce two mesh analysis equations. For the two-stack system, the primary fuel cell stack 13 may be represented by voltage potential V1, the parasitic load fuel cell stack 11 may be represented by voltage potential V2, the external load 30 may be represented by the resistance R1, and the parasitic load may be represented by the resistance R2. The current loop through the external load and primary fuel cell stack is represented by $i_1$, and the current loop through the parasitic load, parasitic load fuel cell stack, and primary fuel cell is represented by $i_2$. The current through the primary fuel cell stack is the difference between $i_1$ and $i_2$. To begin the step of modeling by performing the act of mesh analysis, the first current loop equation and the second current loop equation set the sum of the voltages around each of the respective current loops equal to zero. Accordingly, the first mesh analysis equation can be represented by the expression:

$$-V1+(i_1 \times R1)=0 \quad \text{(Equation 1)}$$

Similarly, the second mesh analysis equation can be represented by the expression:

$$-V2+V1+(i_2 \times R2)=0 \quad \text{(Equation 2)}$$

The act of performing mesh analysis for the method of designing an internal or self-regulated control may further comprise the use of a curve-fitting routine to generate an algorithm that characterizes the graphical representation of fuel cell performance data generally indicated by curve 44. For instance, based on variations expected for the external load resistance R1, an equation for individual cell voltage (ICV) versus current density (CD) in the primary fuel cell stack may be generated. In one embodiment, a fifth degree polynomial equation was used to produce curve-fit data 42. While this equation may be different for other fuel cells, a representative example of the particular coefficients from curve-fit data 42 are shown in the equation given below:

$$ICV=0.95907-00098107*CD+1.053e\text{-}06*CD^2-7.7086e\text{-}10*CD^3+1.3853e\text{-}13*CD^4 \quad \text{(Equation 3)}$$

By using an equation for computing voltage performance of the fuel cell stack as a function of current density, the act of performing system mesh analysis is reiterative, meaning the calculations are re-computed a number of times until the calculated iterations of polynomial curve-fit data 42 for voltage across the fuel cell stacks closely fits Equations 1 and 2 of the mesh analysis. In other words, curve-fit data 42 is incorporated in the act of performing mesh analysis for the step of modeling the circuit to acquire values for the voltage within the modeled circuit loops.

The step of modeling the electrical circuit for the method of design may further comprise the act of seeking to make the current $i_2$ in the parasitic load 25 (as calculated with Ohm's Law and using the predetermined fixed resistance R2 of the parasitic load and the calculated voltage difference between the two fuel cell stacks given by curve fit data 42) match the current $i_2$ used to calculate the voltage performance of the parasitic fuel cell stack 11, given a pre-selected fuel cell stack area 48 and the pre-selected number of cells 38 in series. The act of performing mesh analysis may then be repeated to down-select a customized set of fuel cell stack operating (i.e., performance) characteristics given certain available design variables, including, for example, fuel cell stack areas 46 and 48, the numbers of individualized fuel cells 38 and 40 in each stack, and the predetermined resistance R2 of parasitic load 25.

The invention may comprise other methods such as methods for operation of a fuel cell power system comprising a self-regulated control of parasitic load by adjusting an amount of power supplied to the parasitic load comprising one or more systems or devices. Such step of adjusting may comprise one or more acts such as, for instance, powering an external variable load with a primary fuel cell stack, establishing a common electrical connection between a first side of a parasitic fuel cell stack and a first side of the primary fuel cell stack, and establishing an electrical connection from a second side of the parasitic fuel cell stack to the first electrical terminal of the parasitic load, whereby operating characteristics of the primary fuel cell stack change with correspondingly changing requirements of the external load to produce an internally-controlled variation in power supplied to the parasitic load.

Other embodiments of the present invention may also include, for example, an embodiment having more than one parasitic fuel cell stack and/or more than one primary fuel cell stack. Further, the distinction between the two or more separate fuel cell stacks may in another embodiment be combined together to a certain extent, whereby the parasitic fuel cell stack supplies power to at least one external load under some circumstances and/or a primary fuel cell stack supplies power to one or more parasitic loads.

While a few exemplary embodiments of this invention have been described in detail above, a person skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures or acts. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures as well as nailing and screwing may be equivalent acts.

What is claimed is:

1. A fuel cell power system for adjusting an amount of power supplied to at least one parasitic load, said at least one parasitic load comprising at least one first electrical terminal and at least one second electrical terminal for receiving power, said fuel cell power system comprising:
    a parasitic fuel cell stack comprising a first plurality of fuel cells;
    a primary fuel cell stack comprising a second plurality of fuel cells, said primary fuel cell stack being operable for powering an external load, said primary fuel cell stack having operating characteristics that predictably change as the operating requirements of said external load vary;
    a common electrical connection between a first terminal of said parasitic fuel cell stack and a first terminal of same electrical potential of said primary fuel cell stack;
    an electrical connection from a second terminal of said parasitic fuel cell stack to said at least one first electrical terminal of said at least one parasitic load; and
    an electrical connection from a second terminal of said primary fuel cell stack to said at least one second electrical terminal of said at least one parasitic load, whereby operating characteristics of said primary fuel cell stack produce an external load-following variation in power supplied to said parasitic load as operating requirements of said external load vary.

2. The fuel cell power system of claim 1 wherein said parasitic fuel cell stack and said primary fuel cell stack comprise two separate fuel cell stacks.

3. The fuel cell power system of claim 1 wherein said first terminal of said parasitic fuel cell stack and said first terminal of said primary fuel cell stack comprise a more positive voltage than said second terminal of said parasitic fuel cell stack and said second terminal of said primary fuel cell stack, respectively.

4. The fuel cell power system of claim 1 wherein said at least one second electrical terminal of said at least one parasitic load is more positive in voltage during operation than said at least one first electrical terminal of said at least one parasitic load.

5. A fuel cell power system that responds to load variations required by an external load, said system comprising:
    at least one parasitic load comprising at least one first electrical terminal and at least one second electrical terminal for receiving electrical power;
    a parasitic fuel cell stack, operatively connected to said at least one parasitic load and arranged to supply electrical power to said at least one parasitic load;
    a primary fuel cell stack, operatively connected to said at least one parasitic load, said primary fuel cell stack capable of supplying electrical power to said external load, said primary fuel cell stack having operating characteristics that predictably create a variable voltage difference between said parasitic fuel cell stack and said primary fuel cell stack responsive to load variations of said external load;
    an electrical connection between a first terminal of said parasitic fuel cell stack and a first terminal of same electrical potential of said primary fuel cell stack;
    an electrical connection from a second terminal of said parasitic fuel cell stack to said at least one first electrical terminal of said at least one parasitic load; and
    an electrical connection from a second terminal of said primary fuel cell stack to said at least one second electrical terminal of said at least one parasitic load,
    said electrical connections among said at least one parasitic load, said parasitic fuel cell stack, and said primary fuel cell stack being such that when said variable voltage difference is applied to said at least one parasitic load then electrical power to said parasitic load is controlled in a self-regulated manner that follows said load variations of said external load.

6. A method for adjusting an amount of power supplied to at least one parasitic load, said at least one parasitic load comprising at least one first electrical terminal and at least one second electrical terminal for receiving power, said method comprising the steps of:
    powering an external variable load with a primary fuel cell stack;
    establishing a common electrical connection between a first side of a parasitic fuel cell stack and a first side of said primary fuel cell stack; and
    establishing an electrical connection from a second side of said parasitic fuel cell stack to said at least one first electrical terminal of said at least one parasitic load whereby operating characteristics of said primary fuel cell stack that predictably change with varying requirements of said external load produce a desirable variation in power supplied to said parasitic load.

7. The method of claim 6, further comprising the step of establishing an electrical connection from a second side of said primary fuel cell stack to at least one second electrical terminal of said at least one parasitic load.

8. The method of claim 6 wherein said first side of said parasitic fuel cell stack and said first side of said primary fuel cell stack produce a more positive voltage than said second side of said parasitic fuel cell stack.

9. The method of claim 8 wherein said at least one second electrical terminal of said at least one parasitic load is more positive in voltage during operation than said at least one first electrical terminal of said at least one parasitic load.

10. The method of claim 6 further comprising the act of selecting a fuel cell area for each of a first plurality of fuel cells of said primary fuel cell stack and of selecting a fuel cell area for each of a second plurality of fuel cells of said parasitic fuel cell stack for producing said desirable variation in power supplied to said parasitic load.

11. The method of claim 6 further comprising the act of selecting a first particular number of a first plurality of fuel cells and a second particular number of a second plurality of fuel cells for producing said desirable variation in power supplied to said parasitic load.

12. A method for adjusting an amount of power supplied to at least one parasitic load in a fuel cell power system, said at least one parasitic load comprising at least one first electrical terminal and at least one second electrical terminal for receiving electrical power, said method comprising the steps of:

powering an external variable load with a primary fuel cell stack;

powering said at least one parasitic load with a parasitic fuel cell stack;

establishing a common electrical connection between a first side of said parasitic fuel cell stack and a first side of said primary fuel cell stack such that said first side of said parasitic fuel cell stack and said first side of said primary fuel cell stack produce a more positive voltage than a second side of said parasitic fuel cell stack; and establishing an electrical connection from said second side of said parasitic fuel cell stack to said at least one first electrical terminal of said at least one parasitic load, whereby operating characteristics of said primary fuel cell stack that predictably change with varying requirements of said external load produce a desirable variation in power supplied to said parasitic load.